United States Patent [19]

Kishi

[11] Patent Number: 5,228,184
[45] Date of Patent: Jul. 20, 1993

[54] METHOD OF MANUFACTURING THIN FILM MAGNETIC HEAD

[75] Inventor: Hisatoshi Kishi, Amagasaki, Japan

[73] Assignee: Mitsubishi Denki Kabushiki Kaisha, Japan

[21] Appl. No.: 905,996

[22] Filed: Jun. 26, 1992

Related U.S. Application Data

[63] Continuation of Ser. No. 731,550, Jul. 17, 1991, abandoned.

[30] Foreign Application Priority Data

Jul. 18, 1990 [JP] Japan .................................. 2-189732

[51] Int. Cl.⁵ .............................................. G11B 5/42
[52] U.S. Cl. ........................................ 29/603; 29/424; 264/317; 427/131
[58] Field of Search ................... 29/603, 424; 427/121, 427/131; 264/316, 317; 360/103, 104

[56] References Cited

U.S. PATENT DOCUMENTS 3,077,005  2/1963  Sokol ............................... 264/316 X
4,705,659  11/1987  Bernstein et al. ............... 264/317 X

OTHER PUBLICATIONS

IEEE Transactions on Magnetics; vol. 25., No. 5; D. W. Chapman; Sep. 1989; pp. 3686–3688.

*Primary Examiner*—Carl E. Hall
*Attorney, Agent, or Firm*—Wolf, Greenfield & Sacks

[57] ABSTRACT

A method of manufacturing thin film magnetic heads. One embodiment of the present method features the step of placing a separating layer on a substrate and placing subsequent element layers of one or more thin film magnetic heads on the separating layer. Upon imposition of separating conditions, the thin film magnetic head is released, allowing the substrate to be reused.

9 Claims, 5 Drawing Sheets

METHOD OF MANUFACTURING THIN FILM MAGNETIC HEAD

This application is a continuation of application Ser. No. 07/731,550, filed Jul. 17, 1991 now abandoned.

BACKGROUND OF THE INVENTION

1. Field of the Invention

This invention relates to a method of manufacturing a thin film magnetic head. Thin film magnetic heads are used in a magnetic disc drives and magneto-optical disc drives.

2. Description of Related Art

Thin film magnetic heads are manufactured in a manner similar to a semiconductor integrated circuit elements, by film forming techniques such as vapor deposition, sputtering or the like or lithography such as photoengraving processes, etching, etc. These methods are advantageous in producing high-accuracy heads in large quantities.

There are two types of thin film magnetic heads hitherto known, i.e., a vertical head wherein a magnetic gap is formed in a direction perpendicular to a substrate surface (film thickness direction) and a horizontal head wherein a magnetic gap is formed along the substrate surface.

The vertical head is put to practical use because in the process of making vertical heads, it is easy to form a gap and vertical heads exhibit resistance against the sliding movement of a medium. On the other hand, the horizontal head makes it possible to complete whole processes, such as air bearing surface processing, in a substrate, since the surface of the head normally oriented to the medium is on the substrate side. Moreover, the depth of the magnetic gap is determined by the thickness of the film in the horizontal head, so that the depth of the gap is easily controlled during manufacture.

The procedures are generally carried out independently in the individual vertical head after the head is cut and separated from the substrate. Performing such procedures on individual vertical heads makes such heads more expensive generally than horizontal heads.

FIG. 1 is a cross sectional view depicting a horizontal thin film magnetic head described in "A NEW APPROACH TO MAKING THIN FILM HEAD SLIDER DEVICES" by IBM at IEEE INTEGRAM '89. As illustrated in FIG. 1, the thin film slider is comprised of the following elements: substrate 1, a protecting film 2, a magnetic gap 3, a lower magnetic core 4, an insulating layer 5, a coil 6, an upper magnetic core 7, a coil leading conductor 8, an insulative protecting film 9, a slider wafer 10 and a connecting conductor 11. The connecting connector 11 is within the slider wafer 10. The protecting film 2 protects the magnetic gap 3 and lower magnetic core 4 from sliding motions.

The manufacturing method and operation of the head shown in FIG. 1 will be described below.

First, the protecting film 2, comprising a metallic film and as a plating substrate, and the magnetic gap 3 are formed on the substrate 1. The magnetic gap 3 is formed with a submicron width through electron beam exposure. The gap is completed by the resist, or by etching a preformed a gap film (generally, inorganic insulative film) on the substrate using the resist as a mask.

A narrow gap width is considerably important to enhance the linear density in magnetic recording. It is thus required to form the pattern with a submicron width.

Next, the lower magnetic core 4 is formed through plating. At this time, the magnetic film is not formed on the part of the magnetic gap having the resist or insulative film. The insulating layer 5, coil 6, upper magnetic core 7 and coil leading conductor 8 are sequentially formed on the lower magnetic core 4 by films and lithography.

Then, the insulative protecting layer 9 is laminated and ground until a connecting part of the coil leading conductor 8 is exposed. The slider wafer 10 is bonded which serves not only to connect the coil terminals to the outside but to support the head elements.

Thereafter, the substrate 1 is dissolved through etching and removed, whereby the magnetic gap surface is exposed. The exposed surface is photoengraved and processed with a facing by ion beams or the like (to form an air bearing surface in a hard disc head).

The above-discussed method has such advantages that the gap of a submicron width is easily formed on a surface because the surface is flat and eventually the gap surface is made flat, and facing process of the head surface can be processed simultaneously for every substrate including several hundred heads without being separated into individual heads.

In the conventional manufacturing method of the thin film magnetic head, it is necessary to dissolve the substrate through etching, and therefore the material for the substrate is limited to one that can be etched. Moreover, it takes a long time to dissolve the substrate through etching. In addition, the substrate cannot be recycled, thereby causing a waste of resources and additional expense.

For example, in the case where Si of 4 inch diameter is used as the substrate, it should be 0.6 mm thick or so from the viewpoint of the strength, and not shorter than several hours is required to dissolve the substrate in a solution of sodium hydroxide.

Si substrate is not suitable in some cases since the coefficient of linear expansion thereof is smaller as compared with that of a magnetic film generally used in the magnetic core (it is desirable that the coefficient of linear expansion of the substrate in a thin film laminated body such as a thin film magnetic head is close to that of the magnetic film). Even if the other material is selected for the substrate, the material is restricted to such one that can be dissolved through etching. Therefore, this presents great limitation as to the choice of material for use as substrate.

Further, since the surface of the element on the substrate side after the substrate is separated is completely flat, positioning of the mask is quite difficult when the surface is processed to form an air bearing surface through photoengraving process. In general, a groove is formed about 10 μm deep to form the air bearing surface. Therefore, it is necessary for the resist as a mask to be 10 μm or more thick to form the groove through ion beam etching, thus making it hard to position the mask by recognizing the differences in index of reflection of the surface material (magnetic core, gap, protecting film against the sliding motion).

SUMMARY OF THE INVENTION

This invention has been devised to solve the aforementioned problems encountered in the prior art.

A first object of this invention is to provide a manufacturing method of a thin film magnetic head, whereby a separating layer is provided on a substrate to separate the substrate later, on which head elements are laminated, so that the substrate can be divided only be removing the separating layer, offering a wide range of selection for the substrate material and enabling recycling of the substrate.

A second object of this invention is to provide a manufacturing method of a thin film magnetic head, whereby one surface of a substrate is processed beforehand to fit with the surface shape of head elements and a slider on the side of confronting a medium, on which a separating layer and head elements are laminated, thereby making it unnecessary to process an air bearing surface and round treatment after the substrate is separated.

The above and further objects and features of the invention will more fully be apparent from the following detailed description with accompanying drawings.

DESCRIPTION OF THE PREFERRED EMBODIMENTS

A manufacturing method of a preferred embodiment of this invention will be discussed below with reference to the accompanying drawings. FIGS. 2(A) through (D) are cross sectional views showing a manufacturing method according to a preferred embodiment of this invention, in which numeral 21 indicates a substrate, 22 a protecting film against sliding motion, 23 a magnetic gap, 24 a lower magnetic core, 25 an insulating layer, 26 a coil, 27 an upper magnetic coil, 28 a coil leading conductor, 29 an insulative protecting film, 30 a slider wafer, 31 a connecting conductor provided within the slider wafer, 32 a separating layer and 33 a groove for separation, respectively.

Figure 1:
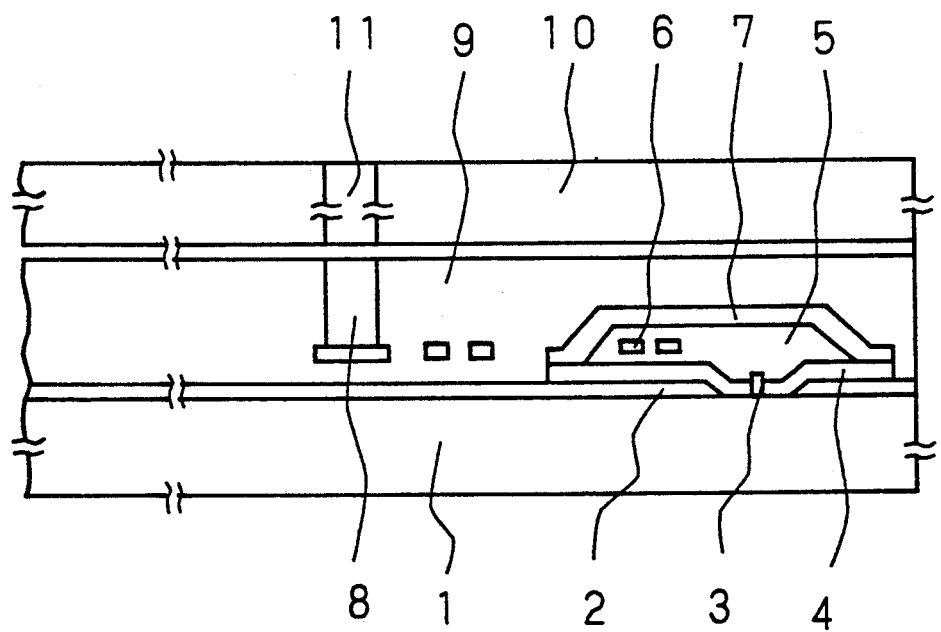
FIG. 1 is a cross sectional view showing a conventional manufacturing method of a thin film magnetic head.
Figure 2A:
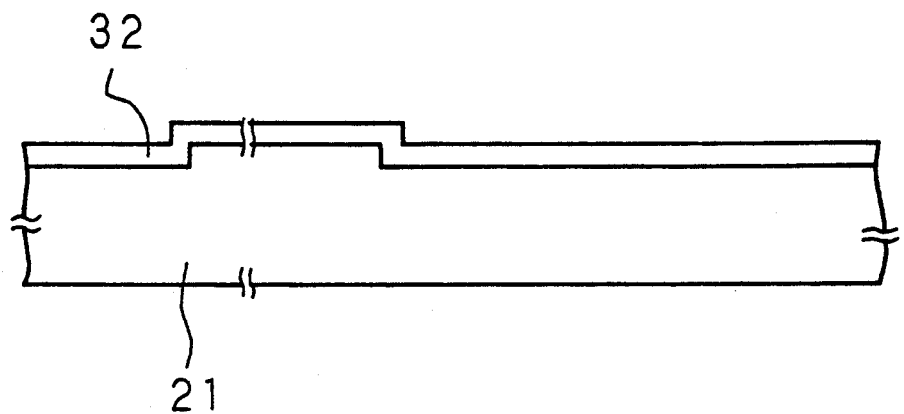
FIG. 2 is a cross sectional view showing steps of a manufacturing method of a thin film magnetic head according to one preferred embodiment of this invention.

Referring to FIG. 2(A), the separating layer 32 made of Cu is provided about 30 μm thick on the substrate 21 separating layer 32 has protrusions and recesses the reverse of those in the slider processing (for example, a groove is formed 300 μm wide and 10 μm deep on the substrate). This separating layer is formed by plating, sputtering, etc.

Figure 2B:
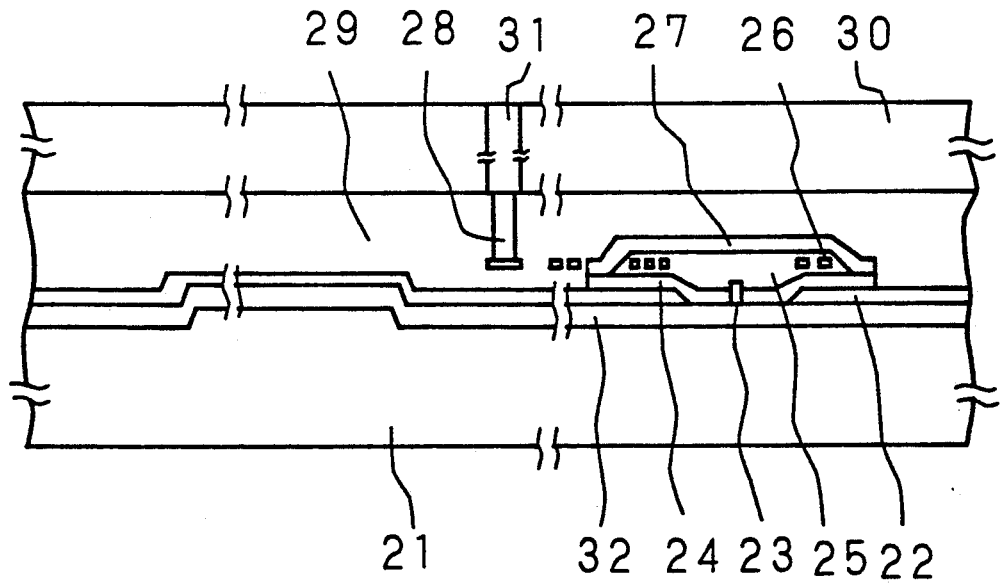

FIG. 2(B) shows the next step following that of FIG. 2(A). Elements of a horizontal thin film head are formed on the substrate in a general manner of manufacturing a thin film magnetic head similar to that in the document cited in the prior art. In the method, the surface is ground to be flat, so that the connecting part is exposed, then, the slider wafer 30 also serving as an electric connection is bounded. The substrate 21 is not flat all over the surface thereof, but is recessed 10 μm deep where the head elements are formed, inversely corresponding to the surface shape of the element. However, since the forming area of the head elements is flat, a photoengraving device of electron beam exposure type or reflection projection exposure type may easily be focused on this area.

Figure 2C:
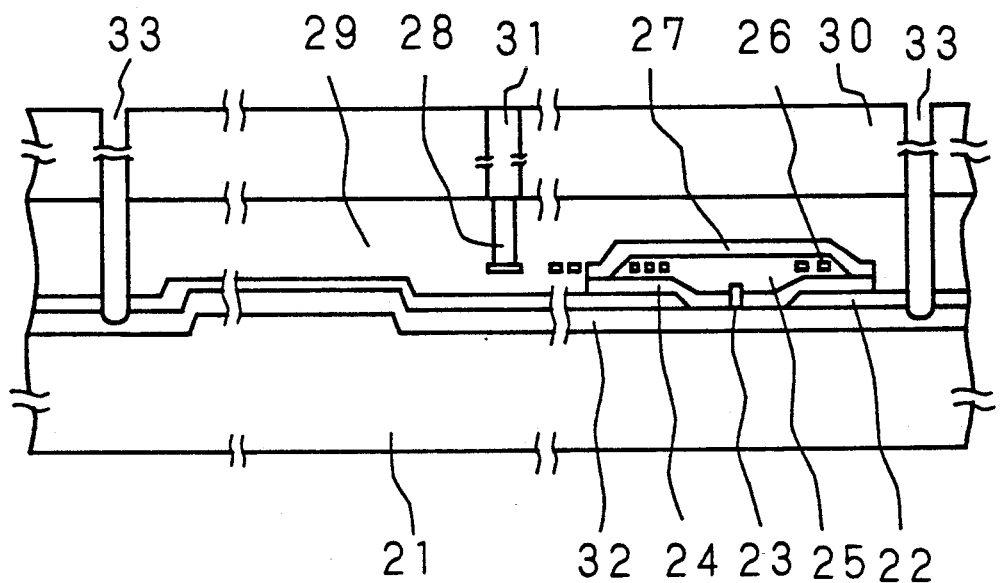

The process of FIG. 2(B) is followed by the step shown in FIG. 2(C), wherein the groove 33 is formed to separate the substrate 21. The groove 33 extends only within the Cu layer 32, but not to the substrate surface. The groove 33 is intended to allow easy separation of the substrate; however, the groove 33 is not necessarily formed depending on the kind of means for separating the substrate.

Figure 2D:
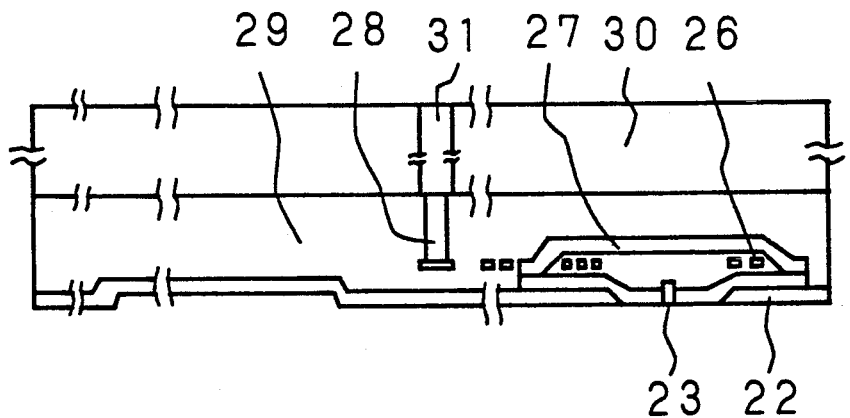
Figure 3A:
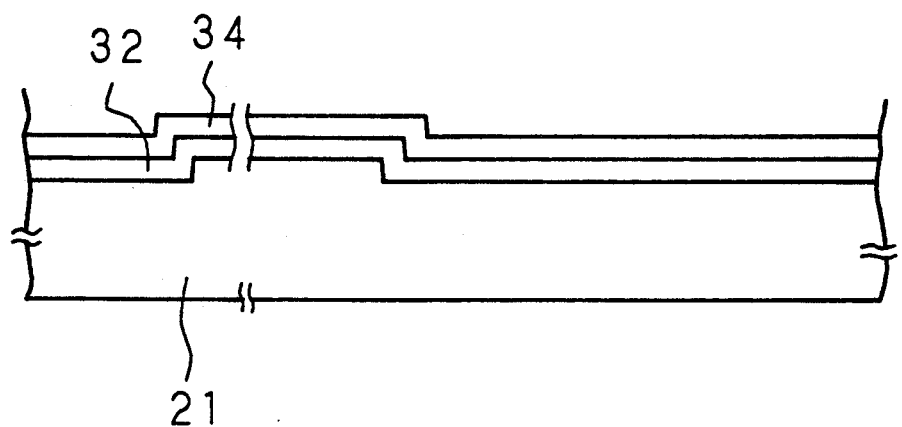
FIG. 3 is a cross sectional view showing steps of a manufacturing method of a thin film magnetic head according to another embodiment of this invention.
Figure 3B:
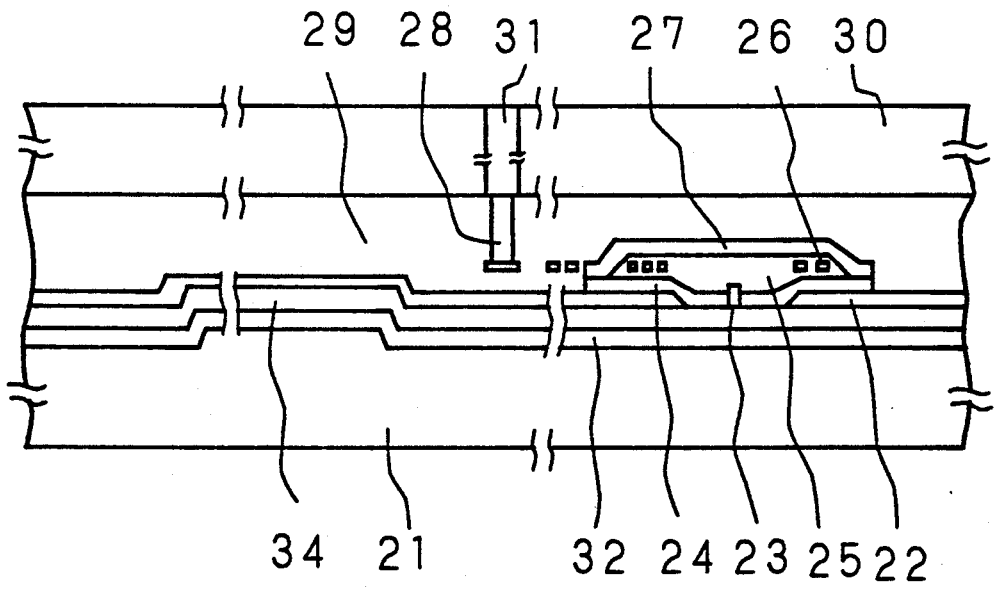
Figure 3C:
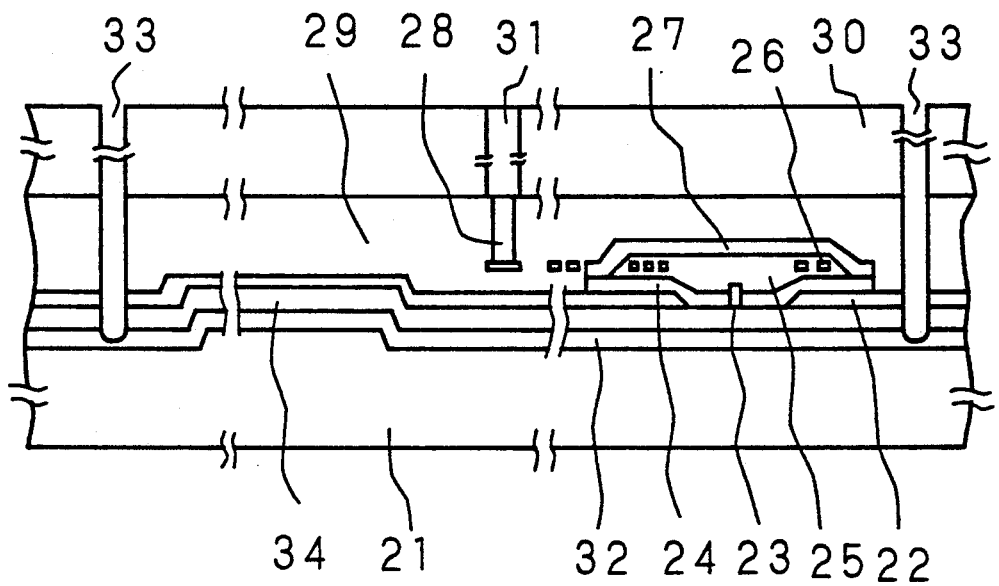
Figure 3D:
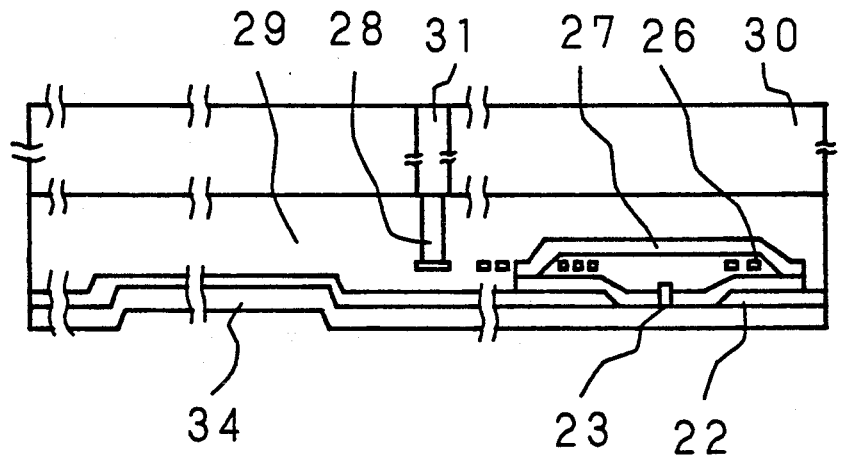

FIG. 2(D) illustrates the head after dissolving the Cu separating layer 32 through etching. The magnetic property of the element and resistance of the coil are checked before separating the element from the substrate. When NiFe alloy is used for the magnetic core, it is possible to dissolve Cu alone in a solution of $NH_4OH$ and ammonium persulfate. Owing to the grooves 33 formed as shown in FIG. 2(C), dissolution proceeds from each side of the exposed Cu provided at the bottom of the element, so that the element can be quickly and perfectly separated from the substrate. As above, the head elements are obtained in the order shown in FIGS. 2(A) through 2(D).

Although the separating layer is provided on the substrate having the surface preliminarily processed according to the foregoing embodiment, even in the case where the separating layer is provided on a general flat substrate, the substrate may be used again.

Moreover, although the separating layer made of Cu which selectively dissolved against the magnetic core is employed as separating means of the substrate in the foregoing embodiment, this invention is not particularly restricted to the above. Any separating layer may be possible so along as it can selectively etched against the magnetic film and protecting film, e.g., aluminum may by employed for the separating layer and dissolved in a solution of sodium hydroxide or the like.

If the separating layer is impossible to be selectively etched, a protecting film may be arranged on the element surface, which is to be remove after the substrate is separated.

Such process as above is made clear from FIGS. 3(A) through 3(D). Numeral 34 denotes a protecting film in FIGS. 3(A) through (D). The other parts are designated by the same reference numerals as in FIG. 2.

By way of example, in the case where the magnetic core is made of NiFe and the separating layer is made of Cu using acid as an etching solution, since both the magnetic core and separating layer are to be etched together, the protecting film is formed in order to avoid etching of the magnetic core. An $Si_2$ or $Si_3N_4$ film is applied to the protecting film, or a set resist film is provided between the separating layer and element. After the Cu is removed through etching thereby to separate the element, the protecting film 34 at the exposed surface is easily removed through plasma etching by use of $CF_4$ gas for the $SiO_2$ or $Si_3N_4$ protecting film, or by the use of $O_2$ gas for the resist protecting film without a damage to the element.

Meanwhile, an organic resin may be used as the separating layer with plasma etching or thermal decomposition using $CF_4$ gas may be carried out to separate the substrate in the example of FIG. 2. In another way, an alloy of a low melting point may be used as the separating layer and melted. When NiFe is applied to the magnetic core by plating, Pb-Sn alloy or the like having a melting point not higher than 300° C. is used for the separating layer. It is not necessary to form the grooves when heat is used to separate the substrate, contrary to the case where chemical reaction is used for that purpose.

Although the separating layer is described as between the substrate and the air bearing surface, which separating layer is placed beforehand on the substrate according to the above embodiments, as part of a continuous process, the separating layer may be applied independently to the substrate in a noncontinuous batch-type process.

When the protecting film against the sliding motion is more difficult to process in comparison with the substrate material, by preliminary processing of the surface shape being the reverse of that in the slider processing, the surface processing of the head element after dissolving the substrate by etching is unnecessary. That is the case where when Si is used for the substrate and alumina is used for the protecting film against the sliding motion. Alumina is chemically etched more easily than Si.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of the claims, or equivalence of such metes and bounds thereof are therefore intended to be embraced by the claims.

What is claimed is:

1. A method of making a thin film magnetic head, said head comprised of element layers and a slider, said element layers forming the elements of said head and said slider adapted to position said elements with respect to a recording medium; comprising
    a. placing a metallic separating layer on a surface of a substrate, said metallic separating layer having a composition capable of being acted upon under removal conditions, said substrate having a composition resistant to removal conditions, said metallic separating layer adapted to receive element layers for one or more heads;
    b. placing element layers for one or more heads on said metallic separating layer, which metallic separating layer is affixed to the surface of said substrate, at least one of said element layers comprising a magnetic element layer for detecting changes in a magnetic field or creating a magnetic field;
    c. placing a slider on said element layers, which element layers are secured to said separating layer;
    d. imposing removal conditions on said metallic separating layer to remove said element layers and slider from said substrate to form one or more heads, said removal conditions having temperatures less than 300° C. to preserve the magnetic features of said magnetic element layer and to allow said substrate to receive a subsequent separating layer; and
    e. repeating steps a–d on said substrate.

2. The method of claim 1 wherein said surface of said substrate has a feature selected from the group of features consisting of recesses and protrusions, which feature is cast into one or more element layers of said head.

3. The method of claim 1 comprising the step of placing a protecting layer between said separating layer and said element layers, and removing said protecting layer after imposition of removal conditions, said protecting layer for protecting said element layers from removal conditions.

4. The method of claim 1 wherein said removal conditions comprise plasma etching.

5. The method of claim 1 wherein said removal conditions comprise thermal decomposition.

6. The method of claim 1 wherein said removal conditions comprise thermal dissolution.

7. The method of claim 1 wherein said removal conditions comprise etching dissolution.

8. The method of claim 1 wherein said metallic composition is copper.

9. A method of making a thin film magnetic head, said head comprised of element layers and a slider, said element layers forming the elements of said head and said slider adapted to position said elements with respect to a recording medium; comprising
    a. placing a separating layer on a surface of a substrate, said separating layer having a composition capable of being acted upon under removal conditions, said substrate having a composition resistant to removal conditions, said separating layer adapted to receive element layers for one or more heads;
    b. placing element layers for one or more heads on said separating layer, which separating layer is affixed to the surface of said substrate; said element layers on said separating layer affixed to said surface having one or more boundaries which boundaries define areas, each area capable of forming a head;
    c. placing a slider on said element layers, which element layers are secured to said separating layer; and
    d. forming a groove extending through said slider and element layers at the boundaries;
    e. imposing removal conditions on said separating layer to remove said element layers and slider from said substrate to form one or more heads from each respective area, and to allow said substrate to receive a subsequent separating layer.

* * * * *